(12) United States Patent
Sessions et al.

(10) Patent No.: US 9,212,525 B2
(45) Date of Patent: *Dec. 15, 2015

(54) RISER CLAMP

(71) Applicant: Parker-Hannifin Corporation, Cleveland, OH (US)

(72) Inventors: Travis L. Sessions, Cedar Hills, UT (US); Gary W. Schroeder, West Valley City, UT (US); Tyler B. Miner, Highland, UT (US); Larry G. Cobb, Kingwood, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,108

(22) Filed: Feb. 6, 2015

(65) Prior Publication Data
US 2015/0152692 A1  Jun. 4, 2015

Related U.S. Application Data

(63) Continuation of application No. 14/444,171, filed on Jul. 28, 2014, now Pat. No. 8,950,501, which is a continuation of application No. 12/990,384, filed as application No. PCT/US2009/042285 on Apr. 30, 2009, now Pat. No. 8,789,605.

(60) Provisional application No. 61/049,054, filed on Apr. 30, 2008.

(51) Int. Cl.
*E21B 17/01* (2006.01)
*E21B 17/08* (2006.01)
(Continued)

(52) U.S. Cl.
CPC ............ *E21B 17/085* (2013.01); *B29C 45/0081* (2013.01); *E21B 17/105* (2013.01); *E21B 17/1035* (2013.01); *B29K 2023/065* (2013.01)

(58) Field of Classification Search
CPC .. E21B 17/085; E21B 17/1035; E21B 17/105
USPC ................. 166/360, 338, 341, 351, 352, 367; 285/124.1–124.4, 420, 406, 407, 410, 285/411, 413, 423; 405/169, 170, 184.4, 405/224.2–224.4
See application file for complete search history.

(56) References Cited

U.S. PATENT DOCUMENTS 2,425,033 A * 8/1947 Fletcher ....................... 248/68.1
2,988,144 A   6/1961 Conrad
(Continued)

FOREIGN PATENT DOCUMENTS

DE   27 17 713   10/1978
GB   2 124 676    2/1984
(Continued)

OTHER PUBLICATIONS

International Search Report and Written Opinion of corresponding International Application No. PCT/US2009/042285, dated Feb. 24, 2010.

(Continued)

*Primary Examiner* — Matthew Buck
(74) *Attorney, Agent, or Firm* — Renner, Otto, Boisselle & Sklar, LLP

(57) ABSTRACT

A riser clamp (20) comprising a first jaw portion ($21_1$) and a second jaw portion ($21_2$) that can be opened and closed relative to each other. The jaw portions ($21_1/21_2$) each comprise a thermoplastic body ($30_1/30_2$) that can be, for example, injection molded pieces of polyethylene (e.g., HDPE). The jaw portions ($21_1/21_2$) can be connected by a hinge (39) that is integrally formed therewith. The clamp (20) can also include cradles ($70_1/70_2$) and caps ($71_1/71_2$) for holding auxiliary lines.

13 Claims, 3 Drawing Sheets

(51) Int. Cl.
  *E21B 17/10*  (2006.01)
  *B29C 45/00*  (2006.01)
  *B29K 23/00*  (2006.01)

(56)     References Cited

U.S. PATENT DOCUMENTS

| | | | | |
|---|---|---|---|---|
| 3,002,241 | A * | 10/1961 | Scurlock | 285/124.1 |
| 3,410,613 | A * | 11/1968 | Kuus | 175/325.7 |
| 3,557,564 | A * | 1/1971 | Hauber | 405/169 |
| 3,664,621 | A * | 5/1972 | Savoie | 248/74.1 |
| 3,705,432 | A * | 12/1972 | Watkins, Jr. | 441/133 |
| 3,729,756 | A * | 5/1973 | Cook et al. | 441/133 |
| 3,741,252 | A * | 6/1973 | Williams | 138/110 |
| 3,749,429 | A * | 7/1973 | Hauber | 403/403 |
| 4,059,872 | A * | 11/1977 | Delesandri | 24/284 |
| 4,086,971 | A | 5/1978 | Hall et al. | |
| 4,116,015 | A * | 9/1978 | Duncan | 405/169 |
| 4,249,610 | A * | 2/1981 | Loland | 166/360 |
| 4,417,755 | A * | 11/1983 | Gittleman | 285/373 |
| 4,477,207 | A * | 10/1984 | Johnson | 405/195.1 |
| 4,616,707 | A | 10/1986 | Langner | |
| 4,653,782 | A * | 3/1987 | Munday | 285/373 |
| 5,090,742 | A * | 2/1992 | Cohen et al. | 285/114 |
| 5,092,711 | A * | 3/1992 | Langner | 405/169 |
| 5,121,946 | A * | 6/1992 | Jardine | 285/15 |
| 5,161,836 | A * | 11/1992 | McKinnon | 285/373 |
| 5,379,836 | A * | 1/1995 | Jordan | 166/241.6 |
| 5,465,759 | A * | 11/1995 | Carlson et al. | 138/110 |
| 5,542,776 | A * | 8/1996 | Reynolds | 403/389 |
| 5,605,357 | A * | 2/1997 | Bird | 285/15 |
| 5,772,253 | A * | 6/1998 | Hodge et al. | 285/15 |
| 5,960,885 | A | 10/1999 | Edwards et al. | |
| 6,367,849 | B1 * | 4/2002 | Tatsuta et al. | 285/373 |
| 6,534,714 | B2 * | 3/2003 | Daume | 174/78 |
| 6,615,915 | B2 | 9/2003 | Koleilat | |
| 6,702,026 | B2 * | 3/2004 | Allen et al. | 166/367 |
| 6,725,939 | B2 | 4/2004 | Richard | |
| 6,971,413 | B2 * | 12/2005 | Taylor et al. | 138/99 |
| 7,040,406 | B2 | 5/2006 | Dore et al. | |
| 7,093,858 | B1 * | 8/2006 | Russell | 285/28 |
| 7,210,531 | B2 * | 5/2007 | van Belkom et al. | 166/367 |
| 7,398,697 | B2 * | 7/2008 | Allen et al. | 73/800 |
| 7,431,535 | B2 * | 10/2008 | Cupolillo | 405/184.4 |
| 7,614,593 | B2 * | 11/2009 | McClure et al. | 248/229.14 |
| 7,628,665 | B1 * | 12/2009 | Cook et al. | 441/133 |
| 7,690,698 | B1 * | 4/2010 | Curran | 285/367 |
| 7,762,337 | B2 * | 7/2010 | Papon et al. | 166/345 |
| 7,861,982 | B1 * | 1/2011 | McClure | 248/74.1 |
| 7,950,701 | B2 * | 5/2011 | Dole et al. | 285/367 |
| 7,988,104 | B1 * | 8/2011 | Cook et al. | 248/68.1 |
| 8,789,605 | B2 * | 7/2014 | Sessions et al. | 166/360 |
| 8,950,501 | B2 * | 2/2015 | Sessions et al. | 166/360 |
| 2002/0033603 | A1 | 3/2002 | Pallini et al. | |
| 2002/0096611 | A1* | 7/2002 | Meuth et al. | 248/230.8 |
| 2002/0157834 | A1 | 10/2002 | Gallagher et al. | |
| 2003/0029978 | A1* | 2/2003 | Meuth et al. | 248/230.8 |
| 2004/0173356 | A1 | 9/2004 | Dore et al. | |
| 2005/0242253 | A1* | 11/2005 | McClure et al. | 248/230.5 |
| 2005/0249558 | A1 | 11/2005 | Humphreys | |
| 2006/0070741 | A1 | 4/2006 | Pollack et al. | |
| 2006/0115335 | A1* | 6/2006 | Allen et al. | 405/274 |
| 2006/0157252 | A1 | 7/2006 | Dore et al. | |
| 2008/0054636 | A1* | 3/2008 | Reid | 285/411 |
| 2011/0154620 | A1* | 6/2011 | Whitelaw et al. | 24/122.6 |

FOREIGN PATENT DOCUMENTS

| | | |
|---|---|---|
| WO | 93/20327 | 10/1993 |
| WO | 02/01038 | 1/2002 |
| WO | 02/088516 | 11/2002 |

OTHER PUBLICATIONS

International Preliminary Report on Patentability of corresponding International Application No. PCT/US2009/042285, dated Sep. 10, 2010.
"Plastic Properties of High Density Polyethylene (HDPE)," Dynalab Corp., High Density Polyethylene Properties, Technical Information (HDPE), http://www.dynalabcorp.com/technical_info_hd_polyethylene.asp dated Aug. 27, 2010.
"Typical Physical Properties of Compounds of Urethane." American Urethane, Inc., Urethane Properties Physical Properties Urethane, http://www.americanurethane.com/aboutu1.htm dated 2010-18-27.
Allowed claims for U.S. Appl. No. 14/444,171, NOA dated Dec. 9, 2014.
European Examination Report for corresponding European Application No. 09739788.9 dated Mar. 17, 2015.

* cited by examiner

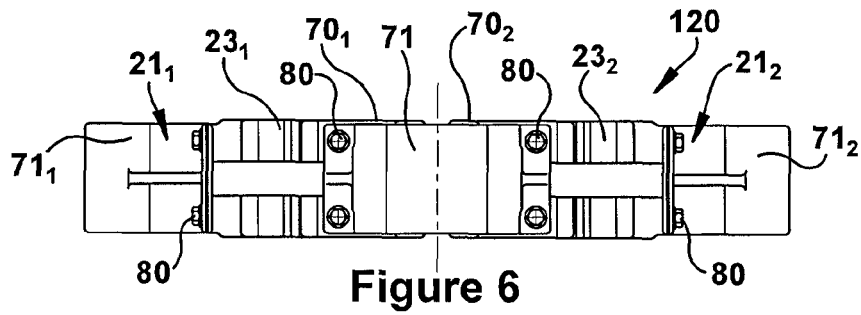
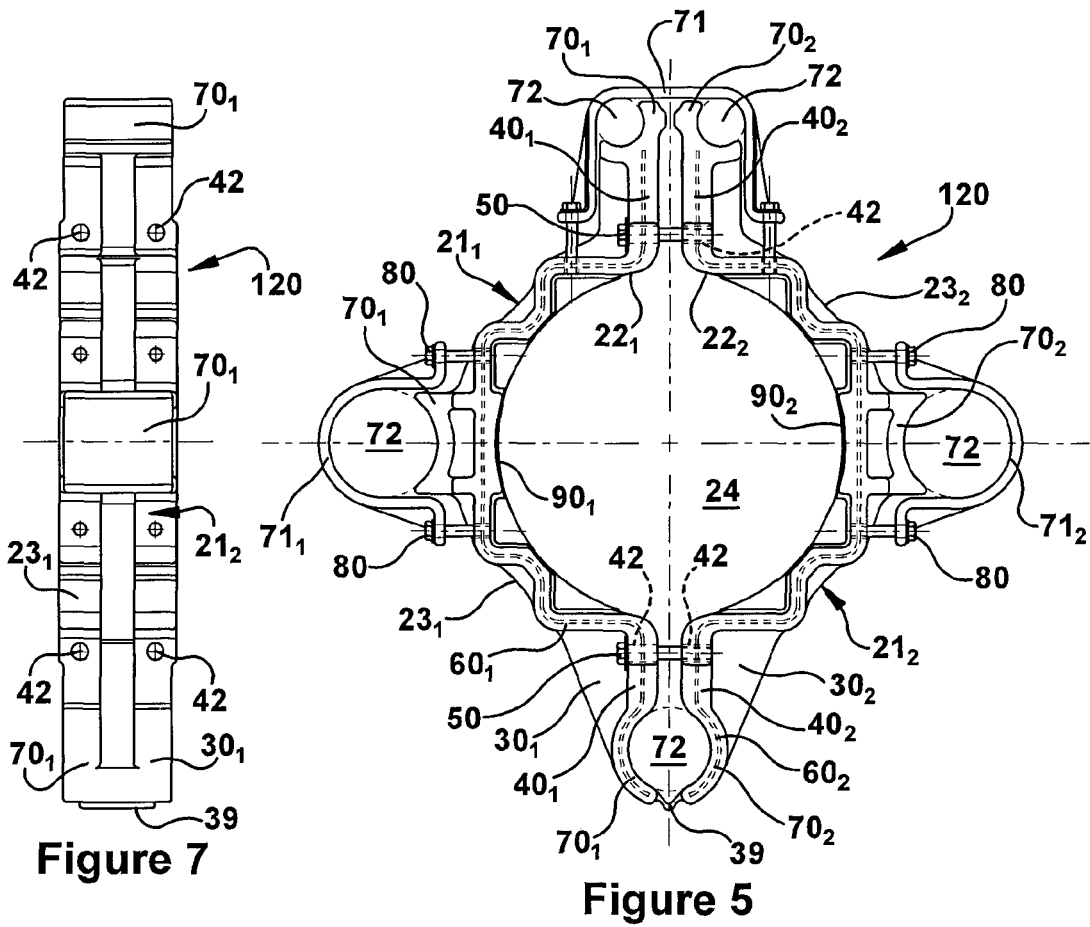
Figure 6
Figure 7
Figure 5

RISER CLAMP

RELATED APPLICATIONS DATA

This application is a continuation of U.S. Non-Provisional application Ser. No. 14/444,171 filed Jul. 28, 2014, which is a continuation of U.S. Non-Provisional application Ser. No. 12/990,384 filed Oct. 29, 2010 which is national phase of International Application No. PCT/US2009/042285 filed Apr. 30, 2009 and published in the English language, which claims priority of U.S. Provisional Application No. 61/049,054 filed Apr. 30, 2008, which are hereby incorporated herein by reference in their entirety.

BACKGROUND

In an offshore drilling operation, a drillstring extends from a rig into a wellbore whereat it drills deeper and deeper into the sea floor. The drillstring extends through a riser which reaches from the rig platform to the wellhead, usually with a subsea blowout prevention stack between it and the ocean floor. During drilling, mud removed from the wellbore is drained to the surface through the riser. The riser can be over 30 cm wide (e.g., it can have about a 53 cm diameter) and it may be thousands of meters long. The riser is typically made of a succession of riser pipes having adjacent ends that are connected and disconnected on the rig to raise and lower the riser into the ocean.

SUMMARY

A riser clamp is provided that comprises thermoplastic jaw portions formed by injection molding of a polyethylene (e.g., HDPE). The clamp can be constructed to have greater strength that its casted cousins made of thermoset plastic (e.g., urethane). Additionally or alternatively, the clamp can be more corrosion-resistant and/or much lighter than an analogous metal riser clamp.

According to another aspect of the invention, a marine riser clamp comprises a first jaw portion and a second jaw portion that can be opened and closed relative to each other; the jaw portions together forming therebetween, when the clamp is closed, an embrace for a riser pipe; the jaw portions each having an arcuate central portion extending between radially outwardly extending jaw connecting flanges forming respective facing sets with the jaw connecting flanges of the other jaw portion, the flanges of each facing set having aligned bolt holes for securing the flanges to one another; the flanges of one facing set including at radially outer ends thereof respective flange cradles for receiving respective auxiliary lines; and further comprising a cap for closing both flange cradles and defining respective embraces between the cap and the flange cradles for holding the auxiliary lines in the flange cradles; the cap being U-shaped with a base for spanning the ends of the flanges and spaced-apart legs for straddling the flanges.

The legs of the cap may have fastener holes that align with fastener holes in the jaw portions for securing the cap to the jaw portions.

The legs of the cap may have outwardly turned feet including the fastener holes of the legs.

The legs may join the base of the base at corners that are rounded to form at inner surfaces thereof circular continuations of opposed surfaces of the respective cradles.

The central portion of each jaw portion may have a second cradle for receiving a respective auxiliary line, and the clamp may further comprise a cap for closing the second cradle to form an embrace for the auxiliary line, the cap being moveable independent of the jaw portions so that the cap can be opened or closed without opening of the jaw portions.

The second cradles may be diametrically opposite one another when the clamp is closed.

The cap may be U-shape with an opening at its radially inner end for receiving the auxiliary line, the cradle may have a concave recess with an opening at its radially outer end for receiving the auxiliary line, and the opening of the cap may have a span greater than the span of the opening of the cradle.

Each second cap may have a flange portion provided with fastener holes that align with fastener holes in the central portion of the respective jaw portion for securing the cap to the jaw portion.

The flanges of the other facing set may be joined together at their radially outer ends for relative pivotal movement.

The flanges of the other facing set may form respective halves of a cradle for receiving and holding an auxiliary line when the clamp is closed.

The jaw portions may be molded from plastic.

Each jaw portion may have a cradle flange extending circumferentially from at least one of the cradles and radially outwardly from a radially inner portion of the jaw portion, which radially inner portion has a greater longitudinal thickness than the cradle flange.

According to another aspect of the invention, a marine riser clamp comprises a first jaw portion and a second jaw portion that can be opened and closed relative to each other; the jaw portions together forming therebetween, when the clamp is closed, an embrace for a riser pipe; the jaw portions each having an arcuate central portion extending between radially extending jaw connecting flanges forming respective facing sets with the jaw connecting flanges of the other jaw portion, the flanges of each facing set having aligned bolt holes for securing the flanges to one another; the central portion of each jaw portion having a cradle for receiving a respective auxiliary line; and further comprising a cap for closing the second cradle to form an embrace for the auxiliary line, the cap being moveable independent of the jaw portions so that the cap can be opened or closed without opening of the jaw portions; the cradle of each central portion having a radially outer concave surface, and the respective cap having a U-shape having a base portion and spaced apart leg portions together forming interiorly thereof a radially inner concave surface for defining with the concave surface of the cradle an embrace for holding the auxiliary line to the clamp; and the legs of the U-shape cap have radially inner end portions including fastener holes that align with fastener holes in the central portion of the respective jaw portion for securing the cap to the jaw portion.

The cradles may be diametrically opposite one another when the clamp is closed.

The cap may be U-shape with an opening at its radially inner end for receiving the auxiliary line, the cradle has a concave recess with an opening at its radially outer end for receiving the auxiliary line, and the opening of the cap may have a span greater than the span of the opening of the cradle.

Each cap may have a flange portion provided with fastener holes that align with fastener holes in the central portion of the respective jaw portion for securing the cap to the jaw portion.

The flanges of one of the facing sets may be joined together at their radially outer ends for relative pivotal movement.

The jaw portions may be molded from plastic.

Each jaw portion may have a cradle flange extending circumferentially from at least one of the cradles and radially outwardly from a radially inner portion of the jaw portion, which radially inner portion has a greater longitudinal thickness than the cradle flange.

The central portion of each jaw portion may include at least one additional cradle with a respective cap for closing the cradle to form an embrace for an auxiliary line.

According to a further aspect of the invention, a marine riser clamp comprises a first jaw portion and a second jaw portion that can be opened and closed relative to each other; the jaw portions each having an inner wall and an outer wall; the inner walls together forming, when the clamp is closed, the clamp=s radially inner surface and an embrace for a riser pipe; the first jaw portion comprising a first plastic body at least partially forming its inner wall; and the second jaw portion comprising a second plastic body at least partially forming its inner wall; wherein the first jaw portion has at least one cradle for holding an auxiliary line and a cap for at the least one cradle; wherein each outer wall is a flange extending radially outward from one of the inner walls, extending circumferentially from the at least one cradle, and having a longitudinal thickness less than a corresponding longitudinal thickness of the inner walls; wherein when the cradle is open, the auxiliary line can be placed in the cradle, and wherein when the cradle is closed by the cap, an embrace is formed for the auxiliary line; wherein the cradle faces radially outwardly; and wherein the cap is moveable independent of the jaw portions when the cap is open.

DRAWINGS

FIGS. 5, 6, and 7 are front, top and side views, respectively of another riser clamp, (the clamp being shown without its caps in FIG. 7.)

DETAILED DESCRIPTION

Figure 1:
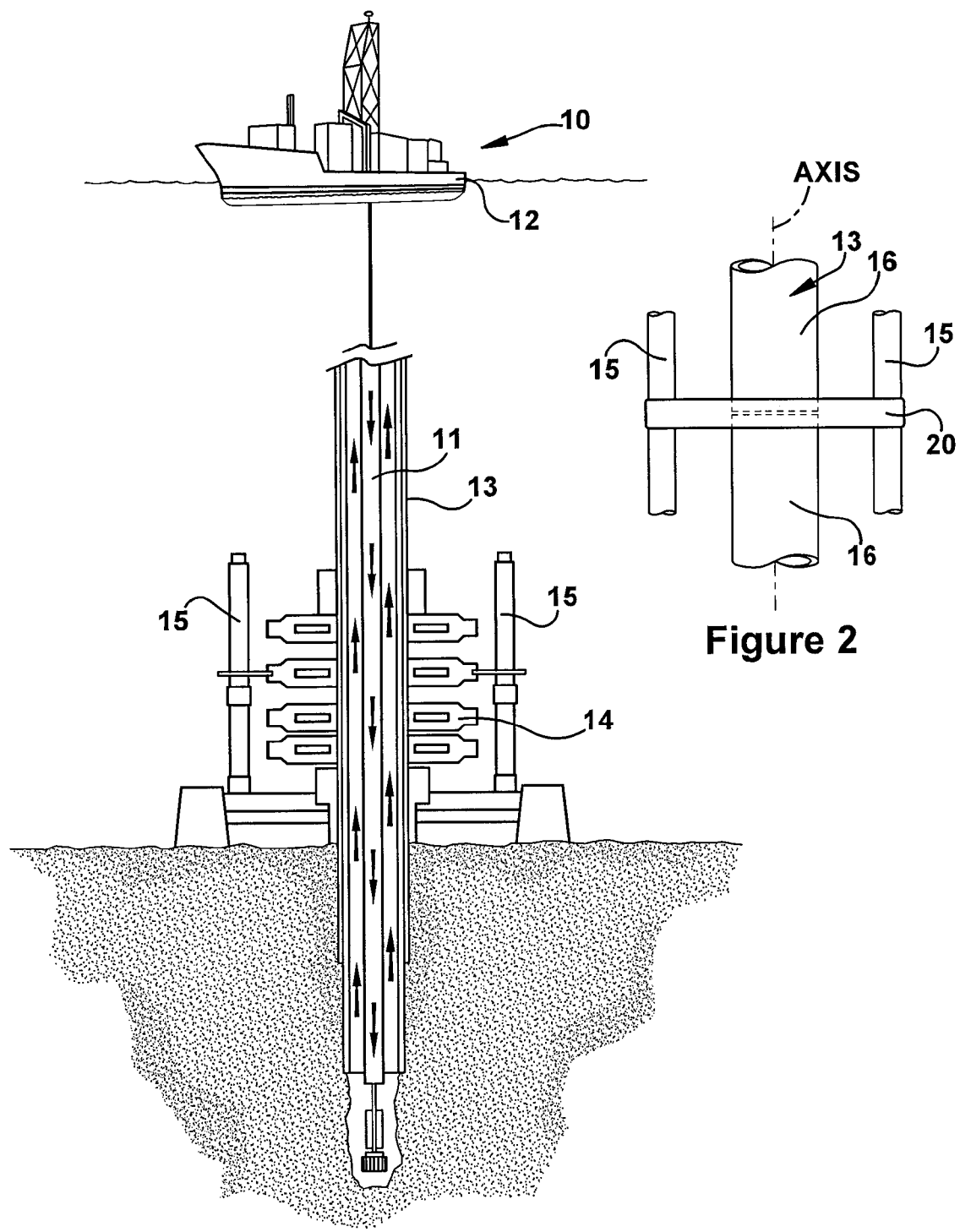
FIG. 1 is a schematic diagram of an offshore drilling operation.

An offshore drilling operation is shown schematically in FIG. 1. In this operation 10, a drillstring 11 extends from the rig 12 into a wellbore whereat it drills deeper and deeper into the sea floor. The drillstring 11 extends through a riser 13 which reaches from the rig platform to the wellhead, usually with a subsea blowout prevention stack 14 between it and the ocean floor. During drilling, mud removed from the wellbore is drained to the surface through the riser 13. The drilling operation 10 will often also include auxiliary lines 15 (e.g., choke lines, kill lines, pneumatic lines, hydraulic lines, equipment control lines, and/or logging lines) that can run alongside the riser 13.

Figure 2:
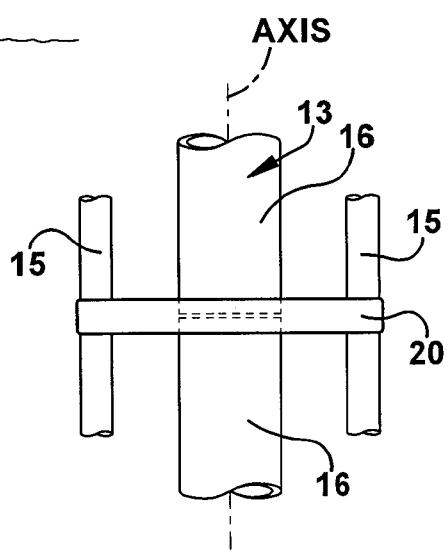
FIG. 2 is a close-up schematic view of a riser clamp connecting adjacent ends of two riser pipes.

As is best seen by referring additionally to FIG. 2, the riser 13 is typically made of a succession of riser pipes 16. The adjacent ends of neighboring riser pipes (i.e., the trailing end of one riser pipe and the leading end of the next riser pipe) can be joined together by a riser clamp 20. The pipes 16 can thereby be connected and disconnected on the rig 12 to raise and lower the riser 13 into the ocean. The auxiliary lines 15 can also be held by the riser clamp 20.

Figure 3:
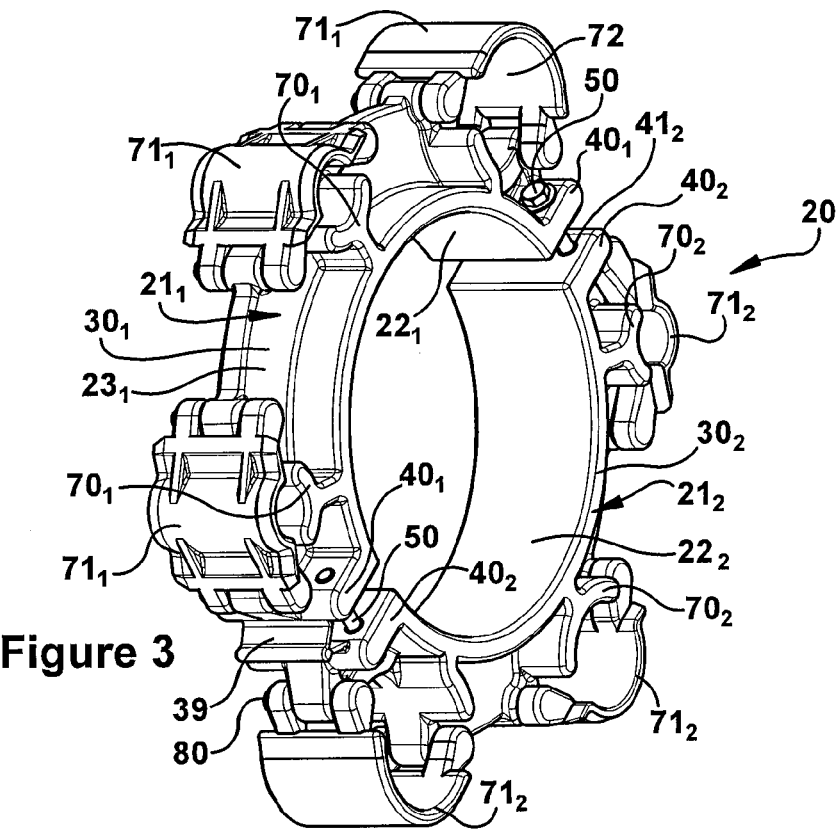
FIGS. 3 and 4 are perspective and plan views, respectively of the riser clamp.
Figure 4:
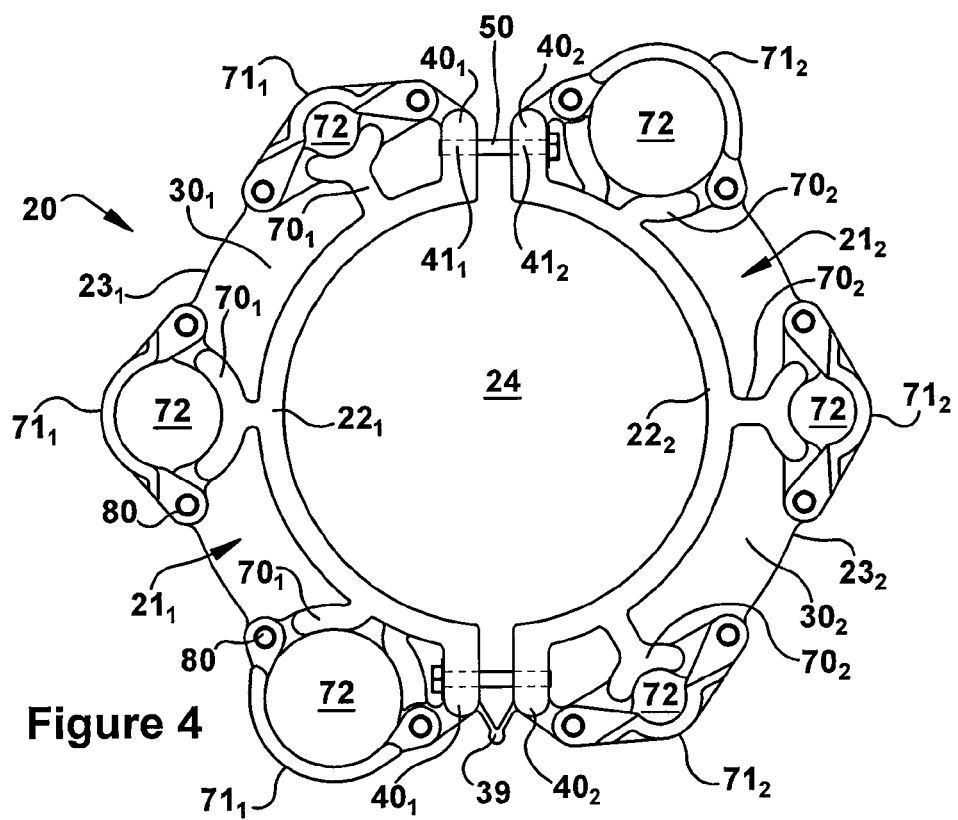

Referring now to FIGS. 3-4, the riser clamp 20 is shown in more detail. While some riser clamps require a lose metal strap to hold them onto the riser, the illustrated clamp 20 can be characterized by the absence of such an external strap. That being said, the use of the clamp 20 in conjunction with an external strap is possible and contemplated.

The clamp 20 can comprise a first jaw portion $21_1$ and a second jaw portion $21_2$ and these jaw portions 21 can be opened and closed relative to each other. The jaw portions 21 each have an inner wall 22 (i.e., jaw portion $21_1$ has an inner wall $22_1$ and jaw portion $21_2$ has an inner wall $22_2$) and an outer wall 23 (i.e., jaw portion $21_1$ has an outer wall $23_1$ and jaw portion $21_2$ has an outer wall $23_2$). When the riser clamp 20 is closed, the inner walls $22_1$ and $22_2$ together form the clamp's radially inner surface and an embrace 24 for the adjacent ends of the to-be-connected riser pipes 16. The outer walls $23_1$ and $23_2$ together form the clamp's radially outer surface.

The first jaw portion $21_1$ comprises a thermoplastic body $30_1$ that at least partially forms its inner wall $22_1$ and its outer wall $23_1$. The second jaw portion $21_2$ likewise comprises a thermoplastic body $30_2$ that at least partially forms its inner wall $22_2$ and its outer wall $23_2$. The first thermoplastic body $30_1$ and/or the second thermoplastic body $30_2$ can be made from a polyethylene thermoplastic, such as a high density polyethylene HDPE thermoplastic. They can be formed in one piece and/or they can be injection molded. With certain clamp designs (such as the hinged design shown in FIGS. 2-3), it may be possible to form the first thermoplastic body $30_1$ in one piece with the second thermoplastic body $30_2$.

The riser embrace 24 is sized and shaped in accordance with the riser 13 and/or riser pipes 16. Thus, the embrace 24 can be, for example, circular in shape and it can have a diameter greater than 30 cm and/or greater than 50 cm. With a circular embrace, the inner walls 22 of the jaw portions 21 can each have a semi-cylindrical shape and they can be symmetrically positioned relative to each other when the clamp 20 is closed.

The riser clamp 20 can further comprise a hinge 39 between its first jaw portion $21_1$ and its second jaw portion $21_2$. The hinge 39 can form, for example, an elbow-like pivot connection that expands/contracts when the jaw portions 20 are opened and closed. The hinge 39 can be integrally formed with the first jaw portion $21_1$ and/or the second jaw portion $21_2$, and more specifically, part of one or both of the thermoplastic bodies 30. In either or any event, the hinge 39 can be made of thermoplastic (e.g., a polyethylene thermoplastic, such as a high density polyethylene HDPE thermoplastic).

In the illustrated riser clamp 20, the each jaw portion 21 includes a pair of jaw-connecting flanges 40 (i.e., the first jaw portion $21_1$ has two jaw-connecting flanges $40_1$ and the second jaw portion $21_2$ has two jaw-connecting flanges $40_2$). The connecting flanges 40 extend radially outward from the respective inner wall 22 of its jaw's thermoplastic body 30, with the flanges 40 of each jaw portion 21 being positioned approximately 180° apart. Each jaw-connecting flange $40_1$ of the first jaw portion $21_1$ faces a corresponding jaw-connecting flange $40_2$ of the second jaw portion $21_2$.

The jaw-connecting flanges 40 can each have fastener openings 41 extending therethrough. When the riser clamp 20 is in a closed condition, the opening $41_1$ on each flange $40_1$ of the first jaw portion $21_1$ is aligned with the opening $41_2$ on the facing flange $40_2$ of the second jaw portion $21_2$. A fastener 50 can extend into and/or through each set of aligned openings 41. The fasteners 50 can comprise for example, metal (e.g., stainless steel) bolts.

The jaw-connecting flanges 40 can be part of the thermoplastic body 30 of the respective jaw portion 21. In the riser clamp 20 shown in FIGS. 2-3, the hinge 39 extends between the distal (i.e., radially outer) ends of one set of facing flanges 40. When opening and closing the riser clamp 20, the opposing set of flanges are diverged and converged relative to each other.

Either or both jaw portions 21 can one or more cradles 70 for holding auxiliary lines 15 and they can have a cap 71 for one, some, or all the cradles 70. When the cap $71_1/71_2$ is open, an auxiliary line 15 can be placed in the cradle $70_1/70_2$, and when the cap $71_1/71_2$ is closed, an embrace 72 is formed for the auxiliary line 15. The aux-line embrace 72 can have circular shape with a diameter less than that of the riser embrace 24. For example, the diameter of the aux-line embrace 72 can be less than 25 cm, less than 20 cm, less than 15 cm, less than 10 cm, and/or less than 5 cm.

The riser clamp 20, and/or each jaw portion 21, can have cradles 70 that are the same size and/or cradles that are of different sizes. In the clamp 20 shown in FIGS. 2-3, for example, the first jaw portion $21_1$ has three cradles $70_1$ of three different diameters. The second jaw portion $21_2$ has three cradles $70_2$ with different diameters, with its largest cradle $70_2$ and its smallest cradle $70_2$ being substantially the same size as the largest and smallest cradles $70_1$ in the first jaw portion $21_1$. Each cradle 70 is provided with its own cap 71 sized in an a corresponding manner.

The cradles 70 can be part of the thermoplastic body 30 of their respective jaw portion 21 (and thus formed in one piece therewith). The caps 71 can be formed separately from the cradles 70 and/or the thermoplastic body 30, and then attached thereto (e.g., with pins 80) during assembly of the riser clamp 20. An advantageous attachment technique may be one wherein the cap 71 can remain attached to its corresponding cradle 70 with, for example, a pivotal connection.

The caps 71 can be made of any suitable material (e.g., a thermoplastic, a polyethylene thermoplastic and/or a HDPE thermoplastic) by any appropriate method (e.g., injection molding). The caps 71 can (or cannot) be made of the same material as the thermoplastic body 30 of their jaw portion 21 and/or they can (or cannot) be made of the same material as their corresponding cradle 70.

Referring now to FIGS. 5-7, another version of the riser clamp 120 is shown. The riser clamp 120 is similar in many ways to the riser clamp 20 shown in FIGS. 2-3, whereby like reference numerals are used to designate like parts.

The riser clamp 120, like the riser clamp 20, has a first jaw portion $21_1$ comprising a thermoplastic body $30_1$ (that at least partially forms its inner wall $22_1$ and its outer wall $23_1$) and a second jaw portion $21_2$ comprising a thermoplastic body $30_2$ (that at least partially forms its inner wall $22_2$ and its outer wall $23_2$). The clamp 120 also has a reinforcement strap $60_1$ embedded in the elastomeric body $30_1$ of the first jaw portion $21_1$ and/or a reinforcement strap $60_2$ embedded in the elastomeric body $30_2$ of the second jaw portion $21_2$. Preferably, but not necessarily, one or both of the reinforcement straps 60 are completely encapsulated within its embedding thermoplastic body 30. The straps 60 can be made from a material which is harder than that used to form the thermoplastic body 30. For example, each reinforcement strap 60 can be made from metal (e.g., stainless steel). The straps $60_1$ and $60_2$, like the thermoplastic bodies $30_1$ and $30_2$, can be approximately symmetrical when the clamp 120 is closed. In the illustrated clamp 120, the reinforcement straps 60 form part of the connecting flanges 40 and part of at least some of the cradles 70.

The jaw-connecting flanges 40 in the riser clamp 120, like those in the riser clamp 20, can each have fastener openings 41 extending therethrough for receipt of fastener 50. The clamp 120 also incorporates fastener-receiving inserts 42 in each these openings 41, which are surrounded by the thermoplastic body 30 of the respective jaw portion 21. The inserts $42_1/42_2$ can have internal threads (e.g. to mate with external threads on the fasteners 50) and/or they can be made of metal. Additionally or alternatively, each insert can be welded or otherwise attached to the internal reinforcement strap $60_1/60_2$ of the respective jaw portion $21_1/21_2$ for further buttressing purpose.

The riser clamp 120, like the riser clamp 20, has cradles 70 that form auxiliary-line embraces 72. But in the riser clamp 120, they share projecting leg portions (of the respective jaw portions 21) with the connecting flanges 40. In one facing set of flanges 40 (the bottom set in FIG. 5), a cradle 70 extends from each flange 40 and they together form the embrace 72. (In riser clamp 120, the hinge 39 extends between these embrace-forming cradles $70_1$ and $70_2$.) In the other facing set of flange 40 (the top set in FIG. 5), a cradle 70 also extends from each flange 40, but they are oriented to form two separate embraces 72 when covered by a common cap 71.

The riser clamp 120 can further comprise a pad $90_1$ positioned against the inner wall $22_1$ of the first jaw portion $21_1$ and a pad $90_2$ positioned against the inner wall $22_2$ of the second jaw portion $21_2$. The pads 90 are intended to contact the riser pipe 16 and to reduce friction between the inner walls 22. To this end, they can be made from an elastomeric material, such as rubber. The pads 90 can have a plan shape following the profile of the inner walls 22 of the jaw portions 21.

The riser clamp 120, like the riser clamp 20 can be used without a lose metal strap to hold it onto the riser 13. But, the use of such an external strap (not shown) may be advantageous with the clamp 120. The strap could be made of, for example, stainless steel, and include openings or slots to accommodate the radial projection of auxiliary lines 15, hinge 39, flanges 40, fasteners 50, cradles 70, caps 71, and/or pins 80.

Although the riser clamp 20/120 has been shown and described with respect to a certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

What is claimed is:

1. A marine riser clamp comprising:
  a first jaw portion and a second jaw portion that can be opened and closed relative to each other;
  the jaw portions together forming therebetween, when the clamp is closed, an embrace for a riser pipe;
  the jaw portions each having an inner wall and an outer wall;
  the inner walls together forming, when the clamp is closed, the clamp's radially inner surface and the embrace for the riser pipe; and
  a plurality of radially protruding portions extending from each of the inner walls;
  wherein each outer wall is a flange extending radially outward from one of the inner walls, extending circumferentially from at least one of the plurality of radially protruding portions, and having a longitudinal thickness less than a corresponding longitudinal thickness of the inner walls;
  wherein each radially protruding portion includes a concave portion forming a portion of an embrace at a radially outward end of the radially protruding portion; and
  wherein each concave portion faces radially outwardly.

2. The marine riser clamp of claim 1, further comprising:
a cap for closing each concave portion and defining respective embraces between the cap and the concave portions for holding an auxiliary line in each of the concave portions.

3. The marine riser clamp of claim 2, wherein the cap is U-shaped with a base for spanning the ends of the flanges and spaced-apart legs for straddling the flanges.

4. The marine riser clamp of claim 1, wherein each radially protruding portion includes an elongated portion with a radial width less than a radial width of the corresponding concave portion.

5. The marine riser clamp of claim 1, wherein two radially protruding portions of a respective jaw portion form portions of a single embrace.

6. The marine riser clamp of claim 1, wherein the inner walls are symmetrically positioned relative to each other when the marine riser clamp is closed.

7. The marine riser clamp of claim 1, wherein the concave portion has a diameter less than about 5 inches.

8. The marine riser clamp of claim 1, wherein the concave portion has a diameter less than 25 cm.

9. A method of manufacturing a marine riser clamp, comprising:
injection molding a first jaw portion and a second jaw portion, the jaw portions together forming therebetween, when the clamp is closed, an embrace for a riser pipe;
injection molding an inner wall and an outer wall of each jaw portion, the inner walls together forming, when the clamp is closed, the clamp's radially inner surface and the embrace for the riser pipe, wherein each outer wall is a flange extending radially outward from one of the inner walls, extending circumferentially from at least one of a plurality of radially protruding portions, and having a longitudinal thickness less than a corresponding longitudinal thickness of the inner walls;
injection molding the plurality of radially protruding portions extending from each of the jaw portions, wherein each radially protruding portion includes a concave portion forming a portion of an embrace at a radially outward end of the radially protruding portion, and wherein each concave portion faces radially outwardly.

10. The method of manufacturing a marine riser clamp of claim 9, wherein the first jaw portion, the second jaw portion, the inner wall of each jaw portion, the outer wall of each jaw portion, and the plurality of radially protruding portions are injection molded with a plastic material.

11. The method of manufacturing a marine riser clamp of claim 10, wherein the plastic material is a thermoplastic material.

12. The method of manufacturing a marine riser clamp of claim 10, wherein the plastic material is a polyethylene material.

13. The method of manufacturing a marine riser clamp of claim 10, wherein the plastic material is a high density polyethylene material.

\* \* \* \* \*